3,367,985
PROCESS FOR THE MANUFACTURE OF
POLYENE COMPOUNDS
Joseph Donald Surmatis, West Caldwell, N.J., assignor to Hoffmann-La Roche Inc., Nutley, N.J., a corporation of New Jersey
No Drawing. Filed Apr. 18, 1966, Ser. No. 543,018
25 Claims. (Cl. 260—666)

The present invention relates to polyene compounds and processes for their preparation. More particularly, this invention relates to a process for utilizing the mother liquors from the commercial synthesis of vitamin A, including oxenin and hydroxenin mother liquors, to prepare carotenoid compounds and certain of the carotenoids prepared thereby.

In the synthetic preparation of vitamin A and also in the isolation of vitamin A from natural sources, the vitamin A active material can only be partially separated in the form of crystalline or all-trans vitamin A from the mixtures which result from its preparation or isolation procedures. Even when the remaining mother liquors are subjected to complicated workup operations according to the hitherto known procedures, it is not possible to isolate the material present in pure crystalline form to a satisfactory extent. Those difficulties are largely due to the vitamin A active material being present in numerous isomeric forms, for example, as 13-cis-, 11-cis-, 11,13-di-cis, 9-cis, 9,13-di-cis-vitamin A or as anhydro vitamin A. The fact that these various isomers are only isomerizable with difficulty is particularly aggravating. Hence, there remains, after the separation of crystalline all-trans vitamin A, a vitamin A active mixture containing various isomers which are usually discarded as waste. That is true despite various attempts which have been made to utilize those mixtures.

Moreover, crude reaction mixtures of intermediates in the commercial synthesis of vitamin A have previously been discarded as waste. In the synthesis of vitamin A from 4 - [2',6',6'-trimethyl-cyclohexen-1'-yl]-2-methyl-2-buten-1-al with 3-methyl-2-penten-4-yn-1-ol, the intermediate oxenin (1,6-dihydroxy-3,7-dimethyl-9-[2',6',6'-trimethyl-cyclohexen-1'-yl]-2,7-nonadien-4-yne) can be prepared by reacting 1-hydroxy-3-methyl-2-penten-4-yne with about 2 molar equivalents of an alkyl magnesium halide, e.g., ethyl magnesium chloride or bromide and reacting the resulting Grignard complex with a $C_{14}$ aldehyde (4 - [2',6',6' - trimethyl-cyclohexen - 1' - yl]-2-methyl-2-buten-1-al). The oxenin intermediate thus prepared can be hydrogenated in a conventional manner to the intermediate hydroxenin (1,6-dihydroxy-3,7-dimethyl-9-[2',6',6'-trimethyl-cyclohexen-1'-yl]-nonatriene-2,4,7). Heretofore, the mother liquors remaining after removal of either oxenin or hydroxenin from the reaction mixture have been discarded as useless.

There has now been discovered a process by which the conversion of the difficultly crystallizable vitamin A isomeric mixture resulting from synthetic or extractive processes into useful carotenoids can be effected. Indeed, useful carotenoids can be obtained from difficultly crystallizable vitamin A isomeric mixtures resulting from synthetic or extractive processes without purifying the intermediates formed by the conversion process. This latter feature of not purifying the intermediates represents an important advance in the art since savings in time, equipment and expense are realized thereby. The instant process can also utilize the previously discarded intermediate oxenin and hydroxenin mother liquors. The processes of the invention utilize triaryl-, diarylmonoalkyl-, monoaryldialkyl-phosphonium salts, which can be reacted without even being isolated, with unsaturated aldehydes to form valuable carotenoids.

Accordingly, the present invention relates to a process for the preparation of carotenes wherein difficultly crystallizable vitamin A active alcohols from the synthetic or extractive preparation of vitamin A or esters thereof (it being understood that the esters are not reacted directly but are first saponified to the corresponding alcohol) are reacted with an oxidizing agent, e.g., manganese dioxide, to form the corresponding aldehyde; and the resulting aldehyde, preferably without being isolated or purified, is reacted with a phosphonium salt of a vitamin A alcohol, e.g., triaryl-, diarylmonoalkyl-, monoaryldialkyl-phosphonium salts to form cis-$\beta$-carotenes. Thus, the present invention can be employed to produce cis-carotenes utilizing as the initial reactants the cis-vitamin A alcohol isomers and/or lower alkyl esters thereof present in mother liquors obtained from the commercial synthesis of vitamin A as well as pure cis-vitamin A alcohol isomers. In addition, the present invention can be employed to produce cis-carotenes utilizing as the initial reactants oxenin and hydroxenin mother liquors which have been previously discarded as waste.

The aforementioned vitamin A esters are first saponified to the corresponding cis-vitamin A alcohol isomers by treatment with an alkali metal hydroxide, e.g., sodium hydroxide or potassium hydroxide in a lower alkanol, e.g., methanol or ethanol. The vitamin A alcohol isomers are then extracted with a hydrocarbon solvent, e.g., petroleum ether fraction, benzene, hexane, heptane, chlorinated methanes, e.g., methylene chloride, with hexane being preferred.

The cis-carotene produced by the instant process can be isomerized to trans-carotene. The isomerization can be effected by known isomerization methods.

It is to be understood that the instant process is applicable to all crude mixtures obtainable from the known vitamin A processes whether from natural or synthetic sources including crude mixtures of oxenin and hydroxenin mother liquors. It will be recognized that the instant process is equally applicable to pure starting materials, but is particularly beneficial and of great economic advantage in that it can utilize heretofore discarded crude materials as starting reactants. Examples of known vitamin A synthesis by which crude mixtures of vitamin A are obtained are:

From 4-[2',6',6'-trimethyl-cyclohexen-1'-yl]-2-methyl-2 - buten-1-al with 3-methyl-2-penten-4-yn-1-ol, Helv. Chim. Acta, 1947, 30, p. 1911 and Helv. Chim. Acta, 1949, 32, p. 489.

From $\beta$-ionylidene-ethyl-triphenyl-phosphonium halides and $\beta$-formyl-crotonic acid esters or $\gamma$-acyloxy-tiglinic aldehydes, Angew. Chemie, 1960, 72, p. 811.

From 6-[2',6',6'-trimethyl-cyclohexen-1'-yl]-4-methyl-4-hydroxy-5-hexen-1-yne or 6-[2',6',6'-trimethyl - cyclohexen-1'-yl]-4-methyl-3,5-hexadien-1-yne and 3-keto-butanal diacetal, U.S. Patent No. 2,676,992, Angew. Chemie, 1960, 72, p. 955.

From $\beta$-ionylidene acetaldehyde by condensation with acetone followed by condensation with cyanoacetic acid or esters thereof, D.A.S. No. 1,041,950.

From $\beta$-ionylidene acetaldehyde and senecioic acid esters, Journal of Vitaminology, 1958, 4, p. 178.

Also, concentrates obtained from natural sources (such as, for example, fish liver oils) can be reacted with success according to the process of the invention.

In the commercial synthesis of vitamin A, the intermediate oxenin can be precipitated in the form of crystals from the solution. The mother liquors remaining after crystallization of oxenin can be distilled and that fraction boiling in the range of about 80° to about 98° C., at about 6 to 12 microns of pressure can be collected. That fraction is mainly a mixture of isomers of oxenin having 20 carbon atoms. The distilled mother liquors thus obtained, can be dissolved in an inert solvent, e.g., in an aliphatic hydrocarbon solvent such as hexane, and the mixture hydrogenated in the presence of a palladium catalyst [see, e.g., H. Lindlar, Helv. Chim. Acta, 35, 446 (1952)], until approximately one molar equivalent of hydrogen is consumed. The hydrogenation product so obtained, namely, crude hydroxenin, is in the form of a syrup.

Alternatively, in the commercial synthesis of vitamin A, hydroxenin may be precipitated from solution in the form of crystals, and the hydroxenin mother liquors which heretofore have been discarded can be concentrated to a syrup, e.g., under a vacuum of about 20 mm. at a temperature up to about 40° C. The concentrated syrupy residue thus obtained consists mainly of compounds having 20 carbon atoms, i.e., crude hydroxenin.

The product obtained from the hydrogenation of the mother liquors remaining after crystallization of oxenin or the concentrated residue obtained after the crystallization of hydroxenin, each of which is in the form of a syrup consisting mainly of compounds having 20 carbon atoms, can be further reacted as described hereafter. The aforesaid syrup can be treated with an acetylating agent such as an acetyl halide, e.g., acetyl chloride or bromide, or acetic anhydride, in the presence of an acid binding agent, e.g., an aromatic amine such as quinoline pyridine, and alkyl substituted pyridine, e.g., a collidine, a lutidine, etc., and the resulting reaction product then treated with a mineral acid, e.g., hydrochloric acid, hydrobromic acid, hydriodic acid, etc., to form a mixture of crude isomers of vitamin A acetate. The crude mixture of vitamin A acetate can then be saponified, e.g., with an aqueous alkali metal hydroxide, such as aqueous sodium hydroxide, followed by removal of any excess alkali metal hydroxide present, e.g., by the addition of carbon dioxide until essentially none of the alkali metal hydroxide is present in the reaction mixture, or by washing out the alkali metal hydroxide with water. The thus saponified product can be extracted with an inert solvent, e.g., an aliphatic hydrocarbon solvent such as hexane or petroleum ether or a chlorinated hydrocarbon. The extracts can be concentrated to obtain a crude syrup containing a mixture of vitamin A alcohol isomers.

The vitamin A alcohol employed in the first step of the process of this invention can be obtained as described above or directly from the crude syrup that results from concentrating the mother liquors after crystallization of vitamin A acetate. That crude syrup is dissolved in an inert solvent (such as a lower alkanol, e.g., methanol or ethanol). The solution of cis-vitamin A-acetate isomers thus obtained is then treated with an alkali metal hydroxide, e.g., sodium hydroxide. From that solution a mixture of crude 13-cis-, 11-cis-, 11,13-di-cis-, 9-cis-, 9,13-di-cis-vitamin A or anhydro vitamin A alcohol is obtained by repeated hydrocarbon extracts (e.g., hexane, for example).

In the first step the crude mixture of vitamin A alcohol isomers can be employed directly or can be subdivided into portions. Although it is preferred to divide that crude mixture into two portions, one portion being oxidized to form a crude mixture of vitamin A aldehyde isomers, the other being treated with a phosphine to form a phosphonium salt, it is to be understood that the whole of the mixture of vitamin A alcohol isomers could be oxidized to form crude vitamin A aldehyde isomers. It is within the confines of the invention that the crude mixture of vitamin A aldehyde isomers thus obtained is then reacted with a phosphonium salt of vitamin A alcohol, regardless of how said phosphonium salt was obtained. Hence, it is contemplated that the phosphonium salt may be obtained from either a portion of the crude mixture of vitamin A alcohol isomers as hereafter described or from any other source including pure vitamin A alcohol.

The preferred method of operation is to divide the crude mixture of vitamin A alcohol isomers into two portions. One portion is treated with an oxidizing agent, e.g., potassium permanganate, manganese dioxide, potassium, dichromate, preferably maganese dioxide, to form crude vitamin A aldehyde. The oxidation reaction is conducted at a temperature of about +10 to about +50° C., preferably at room temperature or about 25–30° C., under an atmosphere of nitrogen. An inert solvent, particularly a hydrocarbon, e.g., petroleum ether or hexane, preferably hexane, or a chlorinated hydrocarbon, e.g., methylene chloride, should be employed.

The phosphonium salt can be prepared by treating a portion of the crude mixture of vitamin A alcohol isomers (or as noted earlier, vitamin A alcohol from any source) with a triaryl-phosphine, e.g., triphenyl-phosphine, tritolyl-phosphine, diphenyltolyl-phosphine and tri-p-methoxyphenyl-phosphine, preferably triphenyl-phosphine. It is to be understood that one or more of the aryl groups of triaryl-phosphine may be a polynuclear condensed ring group, e.g., naphthyl, anthryl, phenanthryl, azulyl and substituted phenyl groups, e.g., tolyl, xylyl or mesityl. In addition, tri-aralkyl-phosphines, e.g., tri-benzyl-phosphine can be employed. An aralkyl group may be used in lieu of one or more of the aryl groups of an aryl-substituted phosphine. Likewise, the crude mixture of vitamin A alcohol isomers may be treated with a diarylmonoalkyl-phosphine, e.g., diphenylmonoalkyl-phosphines such as diphenyloctyl-, diphenyldecyl-, diphenyllauryl- or diphenylpalmityl-phosphine, or a monoaryldialkyl-phosphine, e.g., phenyldioctyl-, phenyldidecyl-, phenyldilauryl- or phenyldipalmityl-phosphine. It is to be understood that although any substituted phosphine can be used, in those phosphines wherein an alkyl group is present, a long chain alkyl group, e.g., octyl, decyl, lauryl or palmityl is preferred. The reaction between the crude mixture of vitamin A alcohol isomers and a substituted phosphine is conducted in the presence of a proton donor or with an acid addition salt of that phosphine. Proton donors which can be employed in the above process include inorganic acids such as hydrohalic acids, especially hydrochloric acid or sulfuric acid. Sulfuric acid is preferred. Moreover, all acids which form acid addition salts with phosphines (e.g., strong organic acids such as benzene-sulfonic or trifluorobenzene acid) as well as those specifically enumerated above can also be employed. When an acid addition salt of a triaryl- or of a diarylmonoalkyl- or of a monoaryldialkyl-phosphine is employed, the acid used to form the acid addition salt can be either a pharmaceutically acceptable strong acid such as the mineral acids and strong organic acids such as the sulfonic acids, e.g., benzene- and toluenesulfonic acid or nonpharmaceutically acceptable strong acids. Nonpharmaceutically acceptable strong acids can also be employed, since the salt is not present in the final carotenoid product, although the salts of pharmaceutically acceptable strong acids are preferred.

The product of the aforesaid reaction between a phosphine or its acid addition salt and a portion of the crude mixture of vitamin A alcohol isomers (or vitamin A alcohol from any source) is a phosphonium salt which is optionally and preferably employed in crude form in the reaction mixture for the next step of the instant process.

In a second reaction step a triaryl- or diarylmonoalkyl- or monoaryldialkyl-phosphonium salt of vitamin A alcohol (which can be obtained as described above or otherwise) is reacted with the crude cis-vitamin A aldehyde formed as described in the first step above.

The condensation of the phosphonium salt with crude cis-vitamin A aldehyde is conducted in the presence of a proton acceptor. The proton acceptors employed are preferably basic agents, e.g., strong bases such as alkali metal hydroxides, alkaline-earth metal hydroxides, alkali metal amides, alkaline-earth metal amides, alkali metal alcoholates, alkaline-earth metal alcoholates, ammonia, strongly basic amines, metallo-organic compounds, particularly Group I metallo alkyl and Group I metallo aryl compounds, such as lithium methyl, lithium phenyl, sodium phenyl, sodium methyl, Grignard compounds, e.g., alkyl and aryl magnesium halides, etc. Sodium methoxide and potassium hydroxide are preferred although sodium amide has been found quite effective.

The temperature has not been found to be critical at any point in the reaction sequence although operating conditions of +10° C. to +40° C. are generally preferred. The preferred solvents employed in the condensation of cis-vitamin A aldehyde with phosphonium salt are methanol, tetrahydrofuran, pyridine, isopropyl and ethyl ether, although any inert solvent may be employed.

The resulting crude mixture of cis-β-carotene isomers can then be isomerized to trans-β-carotene. The preferred method of isomerization is to heat the crude mixture at a temperature of +50° to +120° C., preferably 90–95° C. in a hydrocarbon such as petroleum ether fraction, benzene, hexane, heptane, octane, with heptane being preferred. It is to be understood that other known means of isomerization may be employed such as the use of a trace of iodine in ultraviolet light.

It is preferred to use the crude cis-vitamin A alcohol mixtures obtained from the mother liquors described above for economic reasons. However, pure cis isomers can be employed if desired. For example, 13-cis- or 11-cis-vitamin A alcohol may be oxidized as outlined in step one to form 13-cis- or 11-cis-vitamin A aldehyde. The phosphonium salt of 13-cis- or 11-cis-vitamin A alcohol can be obtained by treating said alcohol with a triaryl-, or triarylmonoalkyl- or monoaryldialkyl-phosphine as described in step two. 13-cis-vitamin A aldehyde (13-cis-retinene) can be condensed with the phosphonium salt of 13-cis-vitamin A alcohol to prepare 13-mono-cis-β-carotene. Similarly, the product of the condensation of 11-cis-vitamin A aldehyde (11-cis-retinene) with the phosphonium salt of 11-cis-vitamin A alcohol is 11-mono-cis-β-carotene. It is to be understood that in either of the reactions above the 13-cis- or the 11-cis-vitamin A aldehyde can be reacted with a phosphonium salt of a vitamin A alcohol regardless of the source of the vitamin A alcohol and the product would be 13-mono-cis or 11-mono-cis-β-carotene depending on the vitamin A aldehyde isomer used.

The following examples will serve to illustrate the invention but by no means are intended to limit or restrict it in any manner. All temperatures are given in degrees centigrade.

*Example 1.—The preparation of neo-a retinene*

In a two liter flask, there were placed 57.2 g. of neo-a vitamin A alcohol, 750 ml. of hexane and 300 g. of manganese hydrate having the approximate empirical formula $$K_2O \cdot MnO \cdot 14MnO_2 \cdot 20H_2O$$

and the reaction was stirred under an atmosphere of nitrogen for 20 hours at 20–25°. The spent manganese hydrate was filtered and thoroughly washed with hexane. On evaporation of the solvent under vacuum at 40°, there was obtained 55.6 g. of crude neo-a retinene as an orange colored syrup. After two recrystallizations from low boiling petroleum ether (30–60°) at −10°, there was obtained 33.6 g. of crystalline neo-a retinene melting at 77°.

*Example 2.—The preparation of 13-mono-cis-β-carotene*

In 300 ml. of methyl alcohol, there were added 26.2 g. of triphenylphosphine and 4.6 ml. of conc. sulfuric acid. This was stirred for 30 minutes. Crystalline vitamin A alcohol (23.4 g.) was dissolved in 200 ml. of methyl alcohol and poured into the reaction flask all at once. Stirring was then continued for 20 hours under an atmosphere of nitrogen.

20 g. of the neo-a retinene described under Example 1 was dissolved in 200 ml. of methyl alcohol and 10 ml. of pyridine.

18 g. of potassium hydroxide was dissolved in 100 ml. of methyl alcohol and half of the cooled solution was added to the reaction mixture described above. Then the neo-a retinene solution and the remainder of the potassium hydroxide solution were added from separate dropping funnels, over a period of 30 minutes. The reaction was stirred overnight under a blanket of nitrogen.

The crude 13-cis-β-carotene was filtered by suction and washed with 500 ml. of methyl alcohol, with 500 ml. of water and finally with 500 ml. of methyl alcohol. After two recrystallizations from methylene chloride-methyl alcohol, 13-mono-cis-β-carotene was obtained melting at 139°. The ultraviolet absorption maximum was at 442 mμ 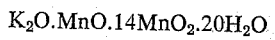 1980)

(in cyclohexane).

*Example 3.—The isomerization of 13-cis-β-carotene to all trans β-carotene*

One gram of 13-mono-cis-β-carotene described under Example 2 was placed in a flask with 5 ml. of heptane and heated under an atmosphere of nitrogen at 95° for 24 hours. This was cooled to room temperature and filtered to give 850 mg. of all trans β-carotene melting at 181°. The ultraviolet absorption maximum was at 454 mμ 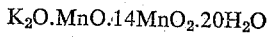 2450)

(in cyclohexane).

*Example 4.—The preparation of trans-β-carotene from crystallization mother liquor neo-a vitamin A*

(a) 951 g. of crude syrup which was obtained by concentrating the mother liquors from the crystallization of trans vitamin A acetate, which assayed 1.0×10⁶ USP units of vitamin A per gram of which at least 70% consisted of neo-a vitamin A (13-cis) along with smaller quantities of all-trans and neo-c (9,13-di-cis) isomers, was dissolved in 5 liters of methyl alcohol. To this there were added 50 ml. of a benzene solution containing 2.5 g. each of BHA and BHT, and 320 ml. of 50% aqueous sodium hydroxide solution. This was stirred under an atmosphere of nitrogen for one hour at 25°. The solution was diluted with an equal volume of water, and 2000 ml. of hexane. Dry Ice was added to the stirred mixture until pH measurements showed that the excess NaOH was all consumed. The hexane layer was separated and the aqueous portion was extracted a second time with 2000 ml. of hexane. The hydrocarbon extracts were combined, water washed, and the solvent was removed under vacuum at a temperature not exceeding 40°. There was obtained 839 g. of crude neo-a vitamin A alcohol.

(b) The above neo-a alcohol was divided into two equal portions. One portion was dissolved in 1500 ml. of hexane. To this was added 720 g. of manganese hydrate having the approximate empirical formula $$K_2O \cdot MnO \cdot 14MnO_2 \cdot 20H_2O$$

and the reaction was stirred in an atmosphere of nitrogen and in the absence of light for 20 hours at 20–25°. The spent manganese hydrate was filtered and thoroughly washed with hexane. On evaporation of the solvent under vacuum at 40°, there resulted 405 g. of crude neo-a retinene.

(c) The second half of the crude neo-a vitamin A alcohol was treated in the following manner. In a five liter flask there was placed 157 g. of triphenylphosphine, 500 ml. of methyl alcohol, and 28 ml. of concentrated sulfuric acid, and the mixture was stirred for one hour.

The crude neo-a alcohol described above was dissolved in one liter of methanol and added to the reaction flask. This was then stirred for 20 hours under an atmosphere of nitrogen.

(d) The aldehyde described under (b) was dissolved in 1000 ml. of methyl alcohol and 25 ml. of pyridine.

110 g. of potassium hydroxide was dissolved in 1000 ml. of methanol and one half was added to the reaction described under (c). Then the neo-a retinene solution and the remainder of the potassium hydroxide solution were added from separate dropping funnels, over a period of 30 minutes. The reaction was stirred overnight under a blanket of nitrogen.

On the following morning the contents of the reaction flask were transferred to a large separatory funnel with 2000 ml. of methylene chloride and 2000 ml. of water. The methylene chloride layer containing the crude carotene was separated and the aqueous portion was extracted with an additional 1000 ml. of methylene chloride. The extracts were combined, water washed and freed of solvent by distilling under vacuum. The red syrupy product consisted of crude 13–cis–$\beta$–carotene.

(e) The above syrup was placed in a flask with two volumes of heptane and stirred under an atmosphere of nitrogen at 95° for 25 hours. This was then cooled overnight in a refrigerator and filtered to yield 140 g. of trans-$\beta$-carotene.

*Example 5.—The prepartion of 11-cis (neo-b) retinene*

86.2 g. of 11-cis vitamin A alcohol (prepared according to W. Oroshnik U.S. Patent 2,920,103) was dissolved in one liter of hexane. Manganese dioxide (400 g.) was added to the flask and the reaction was stirred under an atmosphere of nitrogen for 24 hours. The spent manganese dioxide was filtered off and the solvent was removed by distillation under vacuum to give crude 11-cis retinene, weighing 77.2 g. The crude 11-cis retinene was purified by recrystallization from low boiling petroleum ether at −10° to yield a yellow colored crystalline solid melting at 59°.

*Example 6.—The preparation of 11-mono-cis-$\beta$-carotene*

In 300 ml. of methyl alcohol, there was added 26.2 g. of triphenylphosphine and 4.6 ml. of concentrated sulfuric acid. This was stirred for 30 minutes. Crystalline vitamin A alcohol (23.4 g.) was dissolved in 200 ml. of methyl alcohol and poured into the reaction flask. This was stirred for 20 hours under an atmosphere of nitrogen.

20 g. of the 11-cis-retinene was dissolved in 200 ml. of methanol and 10 ml. of pyridine and charged to a dropping funnel.

Metallic sodium (6 g.) was dissolved in 100 ml. of methyl alcohol and charged to a second dropping funnel.

The reaction flask was cooled to −10° and the contents of both dropping funnels were added at the same time over a period of 30 min. The cold bath was removed and the reaction was stirred under an atmosphere of nitrogen for two hours.

This was stored in a refrigerator overnight. The product which consisted of crude 11-mono-cis-$\beta$-carotene was filtered by suction and washed with methyl alcohol. The product melted at 70°, resolidified at 80°, and then remelted at 165°, indicating isomerization during the melting point determination. The ultraviolet absorption maxima were at 450 m$\mu$ and 475 m$\mu$.

*Example 7.—Conversion of 11-cis-$\beta$-carotene to trans-$\beta$-carotene*

The crude 11-mono-cis-$\beta$-carotene (38 g.) was placed in a flask with 100 ml. of heptane and heated for 20 hours at 90–95° under an atmosphere of nitrogen. On cooling and filtering, there resulted 28 g. of almost pure trans-$\beta$-carotene, melting at 179°.

I claim:
1. A process for the preparation of a cis-$\beta$-carotene comprising the steps of:
   (a) reacting a cis-vitamin A alcohol isomeric mixture with a compound selected from the group consisting of (1) manganese dioxide (2) potassium permanganate and (3) potassium dichromate to form a cis-vitamin A aldehyde isomeric mixture; and
   (b) reacting the so-formed cis-vitamin A aldehyde isomeric mixture with a compound selected from the group consisting of (1) a triarylphosphine salt of a vitamin A alcohol (2) a triarylmonoalkylphosphine salt of a vitamin A alcohol and (3) a monoaryldialkylphosphine salt of a vitamin A alcohol in contact with a proton acceptor to form said cis-$\beta$-carotene.

2. A process according to claim 1 wherein the proton acceptor in step (b) is selected from the group consisting of (1) an alkali metal hydroxide (2) an alkaline-earth metal hydroxide (3) an alkali metal amide (4) an alkaline-earth metal amide (5) an alkali metal alcoholate (6) an alkaline-earth metal alcoholate (7) a Group I metallo alkyl (8) a Group I metallo aryl (9) an alkyl magnesium halide and (10) an aryl magnesium halide.

3. A process according to claim 1 wherein step (a) is carried out with a residue composed essentially of cis-vitamin A alcohol isomers remaining after the separation of crystalline all-trans vitamin A from a reaction mixture obtained from the preparation of all-trans vitamin A.

4. A process according to claim 1 wherein step (a) is carried out with the difficultly crystallizable cis-vitamin A isomeric material resulting from the preparation of vitamin A from the reaction between 4-[2′,6′,6′-trimethyl-1′-cyclohexen-yl]-2-methyl-2-buten-1-al and 3-methyl-2-penten-4-yn-1-ol.

5. A process according to claim 1 wherein step (a) is carried out with vitamin A obtained by saponification of the difficultly crystallizable cis-vitamin A ester isomeric material obtained from the preparation of vitamin A esters by the reaction between $\beta$-ionylidene-ethyl-triphenylphosphonium halide and a compound selected from the group consisting of $\beta$-formyl-crotonic acid esters and $\gamma$-acyloxytiglinic aldehydes.

6. A process according to claim 1 wherein step (a) is carried out with the difficultly crystallizable material resulting from the preparation of vitamin A by reacting a 3-keto-butanol diacetal with a compound selected from the group consisting of 6-[2′,6′,6′-trimethyl-1′-cyclohexen-yl]-4-methyl-4-hydroxy-5-hexen-1-yne and 6-[2′,6′,6′-trimethyl-1′-cyclohexen-yl]-4-methyl-3,5-hexadien-1-yne.

7. A process according to claim 1 wherein step (a) is carried out with the difficultly crystallizable cis-vitamin A isomeric material obtained from the preparation of vitamin A by reaction of $\beta$-ionylidene acetaldehyde with acetone followed by condensation with cyanoacetic acid.

8. A process according to claim 1 wherein step (a) is carried out with the difficultly crystallizable cis-vitamin A isomeric material resulting from the preparation of vitamin A by the reaction between $\beta$-ionylidene acetaldehyde and a senecioic acid ester and saponification of the resulting vitamin A ester.

9. A process according to claim 1 wherein step (a) is carried out with a fish liver oil concentrate.

10. A process according to claim 1 wherein step (a) is carried out with vitamin A obtained by saponification of vitamin A acetate obtained from
   (a) isolating the $C_{20}$ isomer mixture from the mother liquors remaining after the crystallization of oxenin;
   (b) hydrogenating said $C_{20}$ isomer mixture in contact with a lead-poisoned palladium catalyst;
   (c) reacting the resulting hydrogenated mixture with an acetylating agent selected from the group consisting of an acetyl halide, an acetic anhydride in contact with an acid binding agent; and
   (d) treating the resulting reaction mixture with a mineral acid to form a vitamin A acetate isomer mixture.

11. A process according to claim 10 wherein the $C_{20}$ isomers are separated from the oxenin mother liquors by distilling the mother liquors and collecting the fraction boiling in the range of about 80–90° C. at about 6–12 microns pressure.

12. A process according to claim 10 wherein the acetyl halide in step (c) is acetyl chloride.

13. A process according to claim 1 wherein step (a) is carried out with vitamin A obtained by saponification of vitamin A acetate obtained from
   (a) isolating the $C_{20}$ isomer mixture from hydroxenin mother liquors;

(b) reacting said isomer mixture with an acetylating agent selected from the group consisting of an acetyl halide, an acetic anhydride in contact with an acid binding agent; and (c) treating the resulting product with a mineral acid to form a vitamin A acetate mixture.

14. A process according to claim 13 wherein the $C_{20}$ isomer mixture is obtained by concentrating hydroxenin mother liquors under a vacuum.

15. A process according to claim 13 wherein the acetylating agent in step (b) is acetyl chloride.

16. A process according to claim 1 wherein said cis-vitamin A aldehyde is in crude form.

17. A process according to claim 1 wherein step (a) is carried out with 13-cis-vitamin A alcohol.

18. A process according to claim 1 wherein step (a) is carried out with 11-cis-vitamin A alcohol.

19. A process according to claim 1 wherein the cis-$\beta$-carotene formed in step (b) is isomerized to trans-$\beta$-carotene.

20. A process according to claim 1 wherein the cis-$\beta$-carotene formed in step (b) is heated at 90–95° C. in heptane to form trans-$\beta$-carotene.

21. A process for the preparation of trans-$\beta$-carotene comprising the steps of
(a) reacting 13-cis-vitamin A alcohol with manganese dioxide to form 13-cis-vitamin A aldehyde;
(b) reacting the so-formed 13-cis-vitamin A aldehyde with a triphenylphosphine salt of a vitamin A alcohol in contact with an alkali metal hydroxide to form 13-mono-cis-$\beta$-carotene; and
(c) heating the so-formed 13-mono-cis-$\beta$-carotene in a hydrocarbon to form trans-$\beta$-carotene.

22. A process according to claim 21 wherein step (c) is carried out at a temperature of 90–95° C. in heptane.

23. A process for the preparation of trans-$\beta$-carotene comprising the steps of
(a) reacting 11-cis-vitamin A alcohol with manganese dioxide to form 11-cis-vitamin A aldehyde;
(b) reacting the so-formed 11-cis-vitamin A aldehyde with a triphenylphosphine salt of a vitamin A alcohol in contact with an alkali metal hydroxide to form 11-mono-cis-$\beta$-carotene; and
(c) heating the so-formed 11-mono-cis-$\beta$-carotene in a hydrocarbon to form trans-$\beta$-carotene.

24. A process according to claim 22 wherein step (c) is carried out at a temperature of 90–95° C. in heptane.

25. 13-mono-cis-$\beta$-carotene.

References Cited
UNITED STATES PATENTS

| | | | |
|---|---|---|---|
| 2,610,208 | 9/1952 | Surmatis | 260—491 |
| 2,671,123 | 3/1954 | Inhoffen et al. | 260—666 |
| 2,849,507 | 8/1958 | Isler et al. | 260—666 |
| 2,945,069 | 7/1960 | Stern | 260—666 |
| 2,809,216 | 10/1957 | Inhoffen | 260—666 |

OTHER REFERENCES

Von H. Lindlar: Helvetica Chimica Acta., vol. 35, pp. 446–450, 1952.

Chem. Eng. News, vol. 29, No. 39, 3962–3, Sept. 24, 1951; O. Isler et al. (II) Helvetica Chimica Acta., vol. 32, pp. 489, 505, 1949.

Zechmeister: Cis-Trans Isomeric Carotenoids Vitamins A and Ardpolyenes, Academic Press, 1962, p. 84.

PAUL M. COUGHLAN, Jr., *Primary Examiner.*

DELBERT E. GANTZ, *Examiner.*

V. O'KEEFE, *Assistant Examiner.*